No. 662,721. Patented Nov. 27, 1900.
C. HEART.
WHEEL HUB.
(Application filed Oct. 15, 1900.)

(No Model.)

WITNESSES,
Thomas L. Ayers
William A. Thornburg

INVENTOR,
Charles Heart
by
Wm DuVal Brown
ATTORNEY.

THE NORRIS PETERS CO., PHOTO-LITHO., WASHINGTON, D. C.

UNITED STATES PATENT OFFICE.

CHARLES HEART, OF FRANKTON, INDIANA.

WHEEL-HUB.

SPECIFICATION forming part of Letters Patent No. 662,721, dated November 27, 1900.

Application filed October 15, 1900. Serial No. 33,078. (No model.)

*To all whom it may concern:*

Be it known that I, CHARLES HEART, a citizen of the United States, residing at Frankton, in the county of Madison and State of Indiana, have invented a new and useful Wheel-Hub, of which the following is a specification.

My invention relates to a new and useful improvement in metal hubs wherein the hub is made of several parts secured together.

The object of the present invention is to construct a hub with the least possible weight and sufficient strength which can be easily assembled and firmly hold the spokes in position. This and other objects not hereinbefore mentioned are accomplished by the construction illustrated in the accompanying drawings, wherein like letters of reference indicate corresponding parts in the several views, in which—

Figure 1:
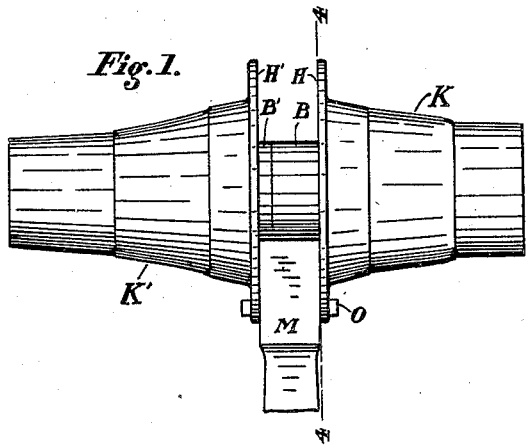
Figure 2:
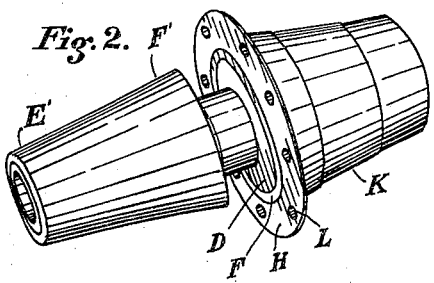
Figure 3:
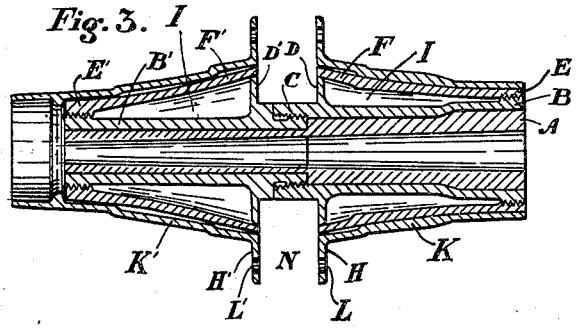
Figure 4:
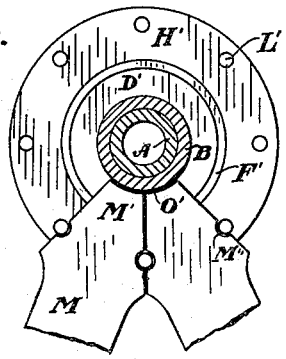

Figure 1 is a side elevation of my improved hub. Fig. 2 is a perspective view of the hub with one rim removed. Fig. 3 is a vertical central longitudinal section through the hub; and Fig. 4 is a section on the line 4 4, the spokes being in elevation.

In the drawings, A designates the ordinary boxing used in hubs. Surrounding the boxing are two sleeves B B', which are screwed together at C, all as shown in Fig. 3. Near the inner end of each sleeve B B' is an annular flange D D', respectively. Screwed to the outer end of each sleeve B B' is a collar E E', respectively. The peripheries F F' of these collars flare outwardly from the point where they are screwed onto the sleeves and extend inwardly toward the center of the hub and terminate on a line flush with the inner surfaces of the annular flanges D D', respectively. As the peripheries of the sleeves and collars are not parallel, they will form a hollow space I, which will lighten the hub and at the same time make the outside side circumference of the hub the proper size.

On each collar E E' is shrunk or otherwise secured a band or rim K K', respectively. On the inner end of each rim is an annular flange H H', respectively. These flanges are flush with the inner ends of the collars and also with the flanges on the sleeves and present a perfectly-smooth surface which the ends of the spokes bear against, as hereinafter described. The annular flanges H H' are provided with a series of apertures L L', which are adapted to be in alinement when the hub is assembled.

In assembling the hub the sleeves are screwed together and placed on the boxing, the collars screwed on the ends of the sleeves, and the rims shrunk on the collars, care being taken to have the inner ends of the various parts flush, as hereinbefore described.

M designates the spokes. The inner ends of these spokes are formed wedge-shaped, as shown at M', Fig. 4. On each side of this wedge-shaped portion is formed a groove M''. The inner ends of the spokes are placed in the space N between the two portions of the hub and secured in place by means of the bolts O, which pass through the apertures in the flange in the rim and in the groove between the spokes.

The inner ends of the spokes are curved, as shown at O', so that they can rest against the peripheries of the sleeves. By forming the rim with annular flanges and also forming the sleeves with annular flanges the two together form a long straight surface, against which the inner ends of the spokes will and can bear, and thereby prevent any lateral movement of the spokes in the hub.

The construction above described will provide a hub wherein the parts will be easily and securely held together, a large portion of it formed hollow, thereby lightening the hub, and provide a deep recess with straight sides, into which the ends of the spokes can fit to prevent any lateral or other movement of the same.

I am aware that slight changes can be made in the construction and arrangement of parts without departing from the nature and principles of my invention.

Having thus described my invention, what I claim as new, and desire to secure by Letters Patent, is—

1. A hub consisting of two sleeves secured together, annular flanges adjacent the inner ends of the sleeves, a collar secured to the outer end of each sleeve, the peripheries of the collars flaring outwardly toward the center of the hub forming a space between the sleeves and collars, the ends of the collars terminating flush with the flanges on the sleeves, a band secured to each sleeve having its inner end flush with the inner ends of the collars and flanges on the sleeves, and an annular flange on the inner end of each band provided with apertures.

2. A hub consisting of two sleeves secured together, annular flanges adjacent the inner ends of the sleeves, a collar secured to the outer end of each sleeve, the peripheries of the collars flaring outwardly toward the center of the hub forming a space and terminating flush with the flanges on the sleeves, a band secured to each sleeve having its inner end flush with the inner ends of the collars and flanges on the sleeves, an annular flange on the inner end of each band provided with apertures, spokes positioned between the inner ends of the bands and rims of the two portions, and bolts passing through the apertures in the flanges and between each spoke for securing the spokes in position and further securing the two portions of the hub together.

In testimony whereof I have hereunto set my hand in the presence of two witnesses.

CHARLES HEART.

Witnesses:
WM. DU VAL BROWN,
W. A. THORNBURG.